(12) United States Patent
Koga et al.

(10) Patent No.: US 6,266,072 B1
(45) Date of Patent: *Jul. 24, 2001

(54) GRAPHICS SYSTEM

(75) Inventors: Kazuyoshi Koga, Hitachinaka; Ryo Fujita, Tokai-mura; Koyo Katsura, Hitachiohta; Katsunori Suzuki; Toshiyuki Kuwana, both of Hitachi, all of (JP)

(73) Assignee: Hitachi, LTD, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,674
(22) PCT Filed: Apr. 5, 1995
(86) PCT No.: PCT/JP95/00659
§ 371 Date: Oct. 3, 1997
§ 102(e) Date: Oct. 3, 1997
(87) PCT Pub. No.: WO96/31844
PCT Pub. Date: Oct. 10, 1996

(51) Int. Cl.[7] .................................................. G06F 15/80
(52) U.S. Cl. ......................... 345/505; 345/422; 345/431; 345/432; 345/502; 345/506
(58) Field of Search .................................... 345/429, 432, 345/426, 431, 422, 502, 503, 505, 506

(56) References Cited

U.S. PATENT DOCUMENTS 5,341,468 * 8/1994 Shiraishi et al. ...................... 345/432
5,706,415 * 1/1998 Kelley et al. ......................... 345/426

* cited by examiner

Primary Examiner—Mark Zimmerman
Assistant Examiner—Kimbinh T. Nguyen
(74) Attorney, Agent, or Firm—Antonelli, Terry, Stout & Kraus, LLP

(57) ABSTRACT

A graphics system which accelerates generation of pixels including transparent objects by simply adding more rendering devices. The system has composition means and a plurality of rendering devices each comprising a geometric processor, a rendering processor and a frame memory that holds color, depth and weight data in a screen bit map format. Given a plurality of sets of color, depth and weight data about any one pixel position from the frame memories, the composition means first compares the depth data, and multiplies successively the weight and color data starting with those corresponding to the depth data closest to the foreground, thereby generating new pixel data. The system thus permits merging of transparent objects.

6 Claims, 7 Drawing Sheets

DISTANCE BUFFER

COLOR PLANE

GRAPHICS SYSTEM

BACKGROUND OF THE INVENTION

The present invention relates to techniques for enhancing the speed of graphics processing performed on workstations, personal computers and the like. More particularly, the invention relates to a graphics system for utilizing a plurality of rendering devices.

In a graphics system implemented by a workstation or the like, graphics processing is accelerated conventionally by a setup comprising a plurality of geometric processors for performing geometric computations in graphics, as well as a plurality of rendering processors for generating pixels. For example, a Z-merger image composition scheme involving a plurality of rendering devices to generate three-dimensional images parallel is used to increase the processing speed of "Subaru: A High-Speed High-Performance 3D CG System" which was discussed in the autumn 1992 symposium of the Institute of Electronics, Information and Communication Engineers (proceedings, pp. 6-602-207). The disclosed system utilizes a plurality of rendering devices, each made up of a geometric processor, a rendering processor and a frame memory. On the level of pixels in which each rendering device effects its output, the system compares depth data (Z values) per pixel so that the color of each foreground pixel is selected. A final image is obtained by the system merging outputs from a plurality of rendering devices.

One advantage of the conventional technique mentioned above is that it is easy to shorten the time for image generation by simply adding more rendering devices, as discussed illustratively by Foley, van Dam, Feiner and Hughes in "Computer Graphics: Principle and Practice" (from Addison Wesley, pp. 906–907).

It should be noted that the disclosed system mentioned above with its Z-merger scheme simply selects pixels during Z value comparison and does not generate new pixel data. This means that the system has difficulty evaluating in Z values any transparent object which lets light pass therethrough. In some cases, transparent objects are not adequately displayed.

SUMMARY OF INVENTION

It is therefore an object of the present invention to overcome the above and other deficiencies of the prior art and to provide a graphics system which boosts the speed of processing on transparent objects by simply adding more rendering devices and which addresses high-performance rendering functions, such as shaded, rendering while maintaining the high-speed processing capability.

In carrying out the invention and according to one aspect thereof, there is provided a graphics system comprising: a plurality of rendering devices each including a first processor for generating rendering commands, a second processor for distributing the generated rendering commands, a frame memory for holding color, depth and weight data in increments of pixels in a screen bit map format, a third processor for executing the distributed rendering commands to write the color, depth and weight data about each pixel to the frame memory; and composition means for composing contents of the frame memories included in the rendering devices, the composition means further outputting the composed result to a display device; wherein the composition means performs arithmetic operations using depth and weight data about any one pixel position (i.e., pixels corresponding to the same X and Y coordinates) read from the frame memories of the rendering devices so as to generate new pixel data about that pixel position, the composition means further outputting the generated new pixel data to the display device.

Preferably, the composition means may be constituted by arithmetic compositors. Given a plurality of sets of color, depth and weight data about the pixels corresponding to the same X and Y coordinates from the plurality of frame memories, the compositors first compare the depth data of the multiple data sets. Regarding the figure closest to the foreground, the compositors multiply the weight and color data associated therewith; and for the next-closest figure, the compositors multiply the applicable weight and color data and add the product to that of the preceding figure, and so on. The compositors continue the product accumulation until the weight data becomes zero.

More specifically, the inventive graphics system may further comprise second frame memories for accommodating the output of the arithmetic compositors. The output of the second frame memories is used as an input to the arithmetic compositors.

As outlined and according to the invention, the arithmetic compositors in their accumulation process compare depth data one pixel at a time, multiply color data about each object, starting with the one closest to the foreground, by the corresponding weight data, and add up products from the multiplication. When the weight data include values representing transparency of objects, it is possible to compose such transparent objects on the screen.

In a setup comprising the second frame memories to hold the output of the arithmetic compositors so that the output of the second frame memories may be used as an input to the arithmetic compositors, the second frame memories amount to an accumulated frame memory arrangement for accommodating compositor outputs. This means that the number of accumulation iterations may be increased even where the number of rendering devices is limited.

DESCRIPTION OF THE PREFERRED EMBODIMENTS

Embodiments of the present invention will now be described with reference to the drawings.

Figure 2:
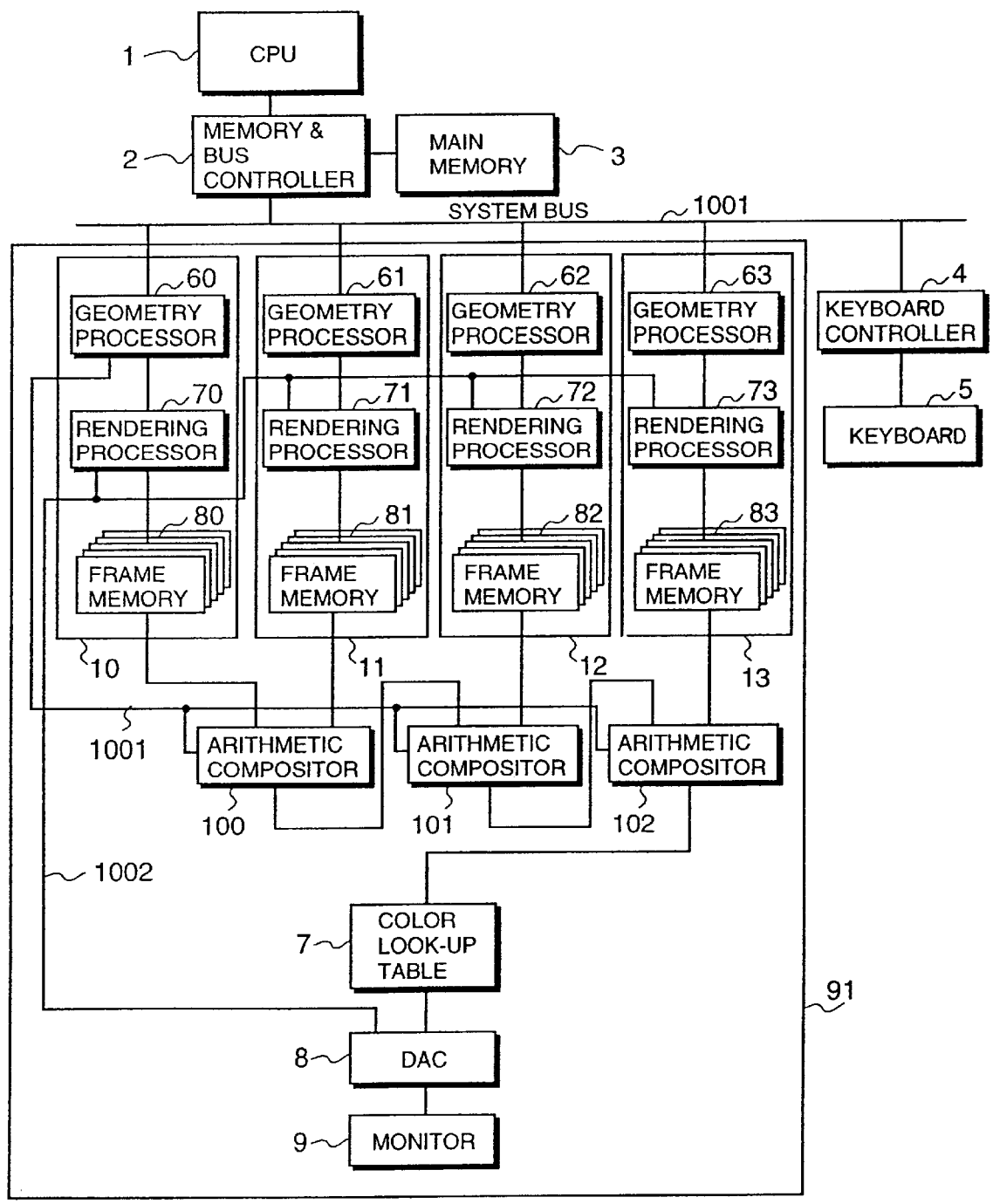
FIG. 2 is an overall block diagram of a system representing an embodiment of the invention.

FIG. 2 is an overall block diagram of a graphics system representing one preferred embodiment of the invention. Inputs from a keyboard 5 are converted to signal form by a controller 4, and the resulting signals are sent to a CPU 1.

Given the signals, the CPU 1 carries out diverse controls and allows application programs to perform their processes accordingly. When an image is to be displayed on a monitor 9, the CPU 1 generates graphics commands that are transmitted over a system bus 1001 to a graphics subsystem 91.

The graphics subsystem 91 comprises a plurality of independent rendering devices 10 through 13, arithmetic compositors 100 through 102 for composing images generated by the rendering devices 10 through 13, a color look-up table 7 including a table for correcting color data from the last-stage arithmetic compositor 102, a DAC 8 for digital-to-analog conversion, and the monitor 9.

Each rendering device (e.g., rendering device 10) comprises a geometric processor 60, a rendering processor 70 and a frame memory 80. The geometric processor 60 performs geometric computations such as figure coordinate translation and brightness calculation in graphics processing. The rendering processor 70 generates a figure through pixel-by-pixel interpolation inside the figure based on the output from the geometric processor 60. The frame memory 80 retains the result of computations from the rendering processor in increments of pixels. That is, the frame memory 80 holds color, depth and weight data per pixel. Illustratively, the frame memory is composed of 24 bits for accommodating color data, 16 bits for depth data and 8 bits for weight data per pixel.

The geometric processor 60 sets function level commands for each arithmetic compositor through a command setting signal line 1004.

The CPU 1 transmits graphics commands to the rendering devices 10, 11, 12 and 13, in that order on a time series basis. Given a graphics command, each rendering device generates an image corresponding to that command. As disclosed in Japanese Patent Laid-Open No. Hei 5-266201, graphics attribute commands are necessary for all rendering devices and are thus broadcast thereto during operation.

For parallel processing to be performed by the rendering devices, a screen divided scheme may be used. Specifically, the CPU 1 assigns a screen area to each of the rendering devices configured. Graphics commands are broadcast to all rendering devices. Upon receipt of a graphics command, each rendering device generates an image in the screen area assigned to the device in question as designated by the received command. A value of 0 is set as weight data for pixels outside the screen area assigned to each rendering device. Using such weight data makes it easy to implement screen divided processing.

Figure 1:
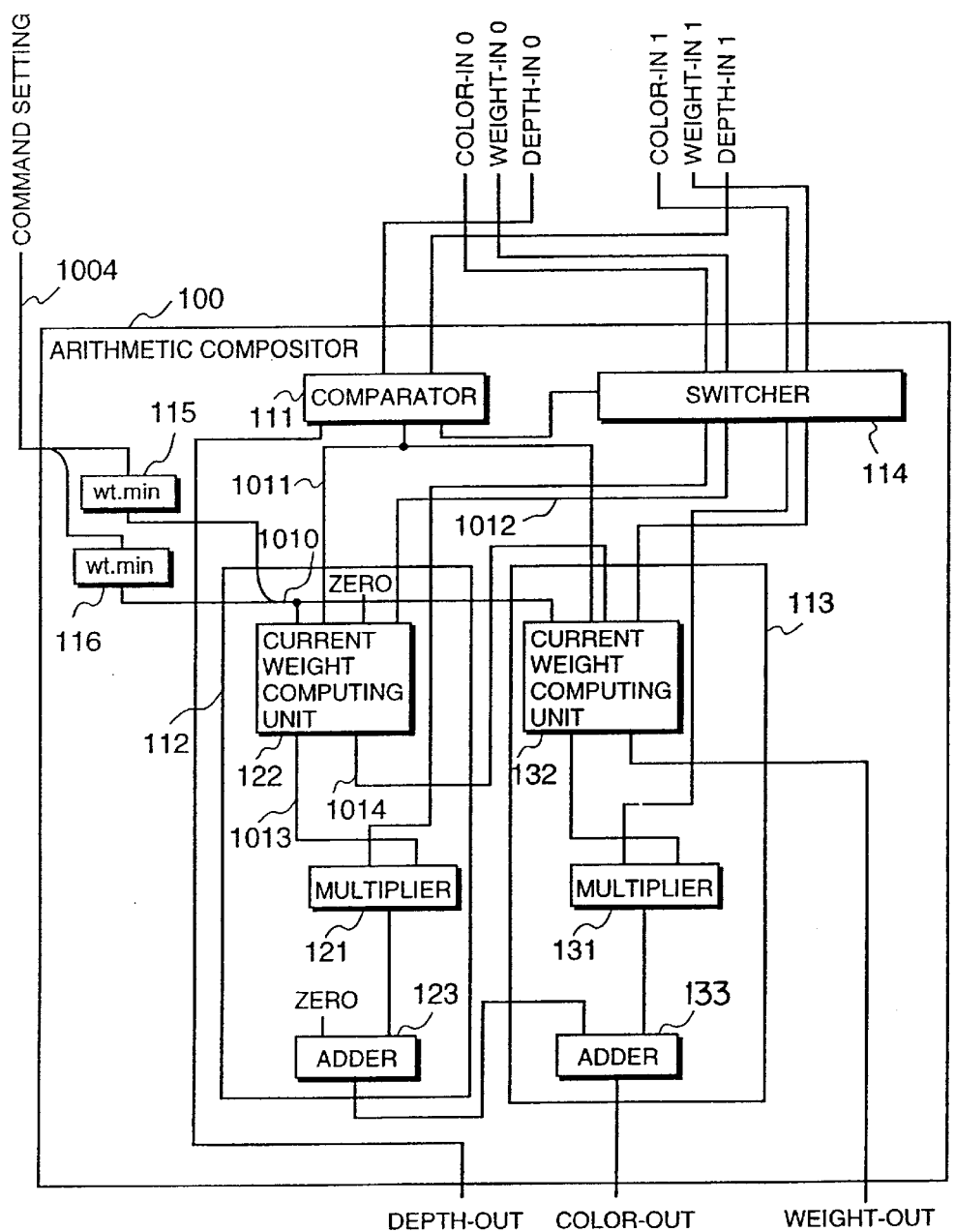
FIG. 1 is a block diagram of an arithmetic compositor.

The images generated by the rendering devices 10 and 11 are sent to the arithmetic compositor 100. In turn, the arithmetic compositor 100 composes the received color, weight and depth data from the rendering devices 10 and 11 into new color, weight and depth data per pixel. The newly generated data are transferred to the next arithmetic compositor 101. What takes place in the arithmetic compositor 100 is illustrated in FIG. 1. For its part, the arithmetic compositor 101 composes the received color, weight and depth data from the arithmetic compositor 100 and rendering device 12 into new color, weight and depth data per pixel. The newly generated data are transferred likewise to the next arithmetic compositor 102. The process is repeated for the rendering devices to compose images successively. When the image from the last rendering device 13 is subjected to composition, the final image is acquired.

The final image is subject to color correction such as gamma correction, by the color look-up table 7. The corrected image is sent to the DAC 8. The DAC 8 converts the received image into analog signals that are compatible in format with the monitor 9. The converted signals are transmitted to the monitor 9.

A synchronizing signal line 1002 is provided. This is a signal line that carries synchronizing signals for synchronizing the transmission of signals from each rendering device to the corresponding arithmetic compositor as well as for ensuring synchronism between the DAC and the monitor.

FIG. 1 is an internal block diagram of the arithmetic compositor 100. The arithmetic compositor 100 receives as its input two sets of color data (COLOR-IN), weight data (WEIGHT-IN) and depth data (DEPTH-IN) per pixel; and, the compositor 100 composes the two sets of input data into new color data (COLOR-OUT), weight data (WEIGHT-OUT) and depth data (DEPTH-OUT).

As initial values, a wt.min register 115 and a wt.max register 116 hold a maximum and a minimum value respectively designating an effective range of weight data. The values are set by means of the command setting signal line 1004.

A comparator 111 compares depth data DEPTH-IN 0 with depth data DEPTH-IN 1, and supplies a switcher 114 with a signal indicating which of the compared pixels is the closer to the foreground. If the two compared pieces of depth data turn out to be the same, a signal line 1011 notifies current weight computing units 122 and 132 of the two compared pixels having the same depth. At the same time, the arithmetic compositor 100 outputs DEPTH-OUT, i.e., a signal representing the DEPTH-IN data about the pixel near the foreground. Under the instruction of the comparator 111, the switcher 114 rearranges the input color and weight data so as to forward to a block 112 the COLOR-IN and WEIGHT-IN data about the pixel closer to the foreground.

The block 112 performs arithmetic operations on the near-foreground pixel and sends the result to a block 113. The block 112 comprises the current weight computing unit 122, a multiplier 121 and an adder 123. Given the weight data from the switcher 114, the current weight computing unit 122 checks the values in the wt.min register 115 and wt.max register 116 to see if the data falls within the acceptable range of weight data. After operating on the current weight data, the current weight computing unit 122 sends the result to the multiplier 121. The weight data accumulated so far is forwarded to the next block 113. The current weight computing unit 122 will be described later in more detail with reference to FIG. 3.

The multiplier 121 multiplies the received current weight data by the corresponding color data. The product from the multiplication is transmitted to the adder 123. The adder 123 adds the current color data to the preceding color data in effect so far. The sum is sent to the next block 113. Since the color data in effect so far is zero for the adder 123, the block is wired to ensure that the preceding color data is always zero.

The block 113 is a block that operates on the data that is the farther of the two sets of data relative to the foreground. What takes place in the block 113 is the same as in the block 112, except that the current weight computing unit 132 outputs weight data WEIGHT-OUT and an adder 133 outputs color data COLOR-OUT. This is where the color and weight data are accumulated.

Figure 3:
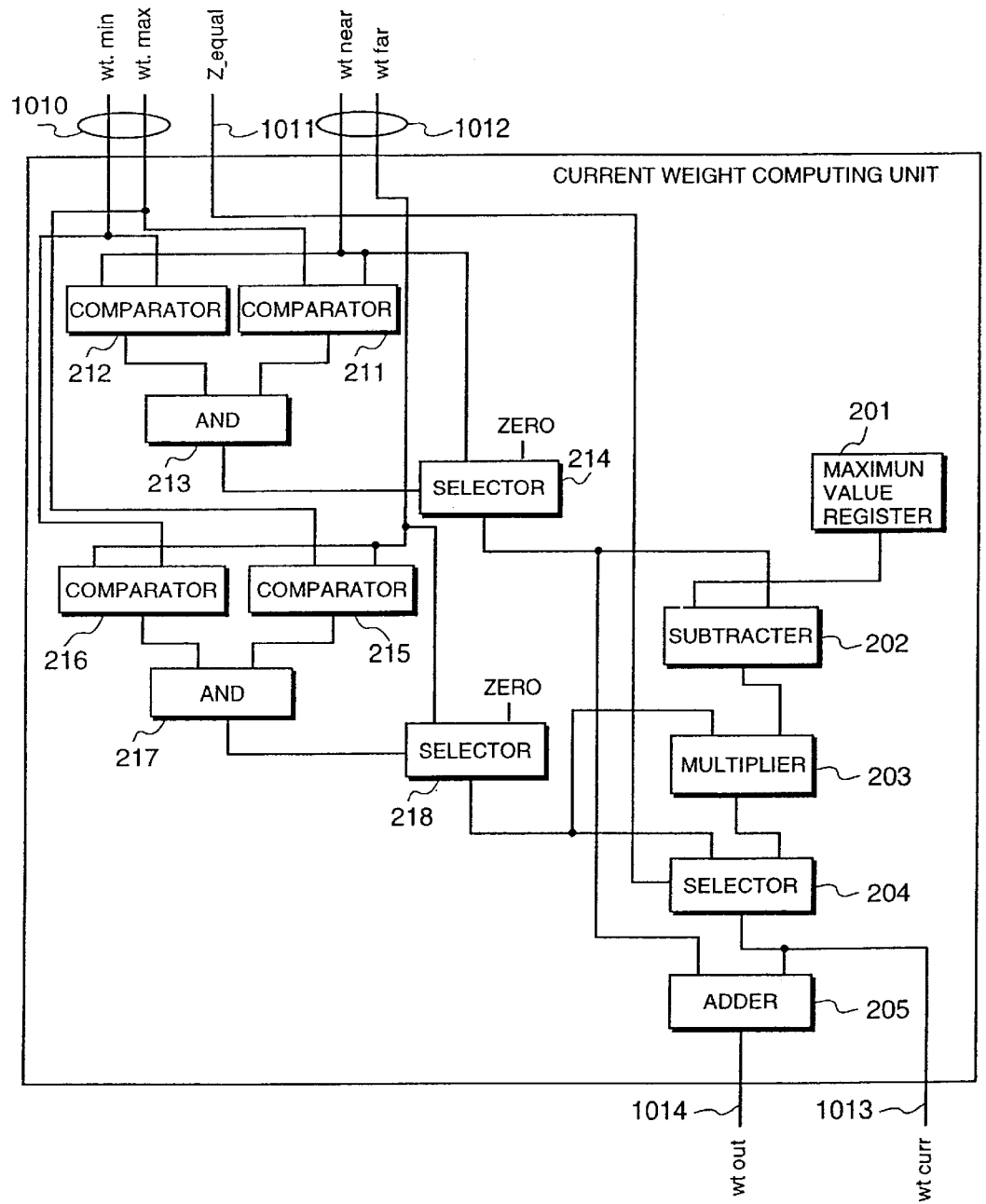
FIG. 3 is a block diagram of a current weight computing unit in the arithmetic compositor shown in FIG. 1.

FIG. 3 is an internal block diagram of the current weight computing unit. Comparators 212 and 211 and an AND circuit 213 check to see if data "wtnear," i.e., weight data near the foreground, falls into the effective range of weight data. A signal reflecting the result of the check is sent to a selector 214. The selector 214 allows the data "wtnear" to pass through if the data is found to be within the effective range. If the data "wtnear" is found to be outside the effective range, the selector 214 outputs zero. Comparators 216 and 215 and an AND circuit 217 perform the same operation on data "wtfar," i.e., weight data far from the foreground.

A subtracter 202 subtracts the output of the selector 214 from the value in the maximum value register 201, and transmits the difference to a multiplier 203. The multiplier 203 multiplies the output of the selector 218 by the output of the subtracter 202, and sends the product to a selector 204. The selector 204 selects the output of the selector 218 if a Z_equal signal on the signal line 1011 is effective; the selector 204 allows the output of the multiplier 203 to go out if the $Z_{13}$ equal signal is invalid, i.e., if the depth data is different. The output of the selector 204 becomes a signal "wtcurr" that is placed onto a signal line 1013. An adder 205 adds the outputs of the selectors 214 and 204 in order to accumulate the weight data. The output of the adder 205 is sent as a signal "wtout" onto a signal line 1014.

The described above are summarized by expressions (1) through (4) given below. That is, the weight data near the foreground is given priority, and the remaining weight of the near-foreground weight data is multiplied by the weight data about the pixel far from the foreground to provide current weight data about the faraway pixel data. Adding up the weight data on the near and far pixels provides weight data combining the near and far data.

(a) When Z_equal is not effective (when depth data is different)

$$wtout = wtnear + (1-wtnear) \times wtfar \quad (1)$$

$$wtcurr = (1-wtnear) \times wtfar \quad (2)$$

(b) When Z_equal is effective (when depth data is the same)

$$wtout = wtnear + wtfar \quad (3)$$

$$wtcurr = wtfar \quad (4)$$

where, subscripts "near" stand for data on the near pixel and "far" for data on the far pixel.

The current weight computing units executing the above expressions are used by the arithmetic compositors that perform operations represented by expressions (5) through (10) below.

(a) When Z_equal is not effective (when depth data is different)

$$Cout = Cnear + WTnear + Cfar \times (1-WTnear) \times WTfar \quad (5)$$

$$Zout = Znear \quad (6)$$

$$WTout = WTnear + (1-WTnear) \times WTfar \quad (7)$$

(b) When Z_equal is effective (when depth data is the same)

$$Cout = Cnear + WTnear + Cfar \times WTfar \quad (8)$$

$$Zout = Znear \quad (9)$$

$$WTout = WTnear + WTfar \quad (10)$$

where, C stands for color data. If WT.min>WT or if WT>WT.max, then processing proceeds on the assumption that WT=0.

The graphics subsystem using the arithmetic compositors functioning as described above obtains the final image by performing arithmetic operations successively on the images rendered by the rendering devices 10 through 13 shown in FIG. 2.

Figure 4:
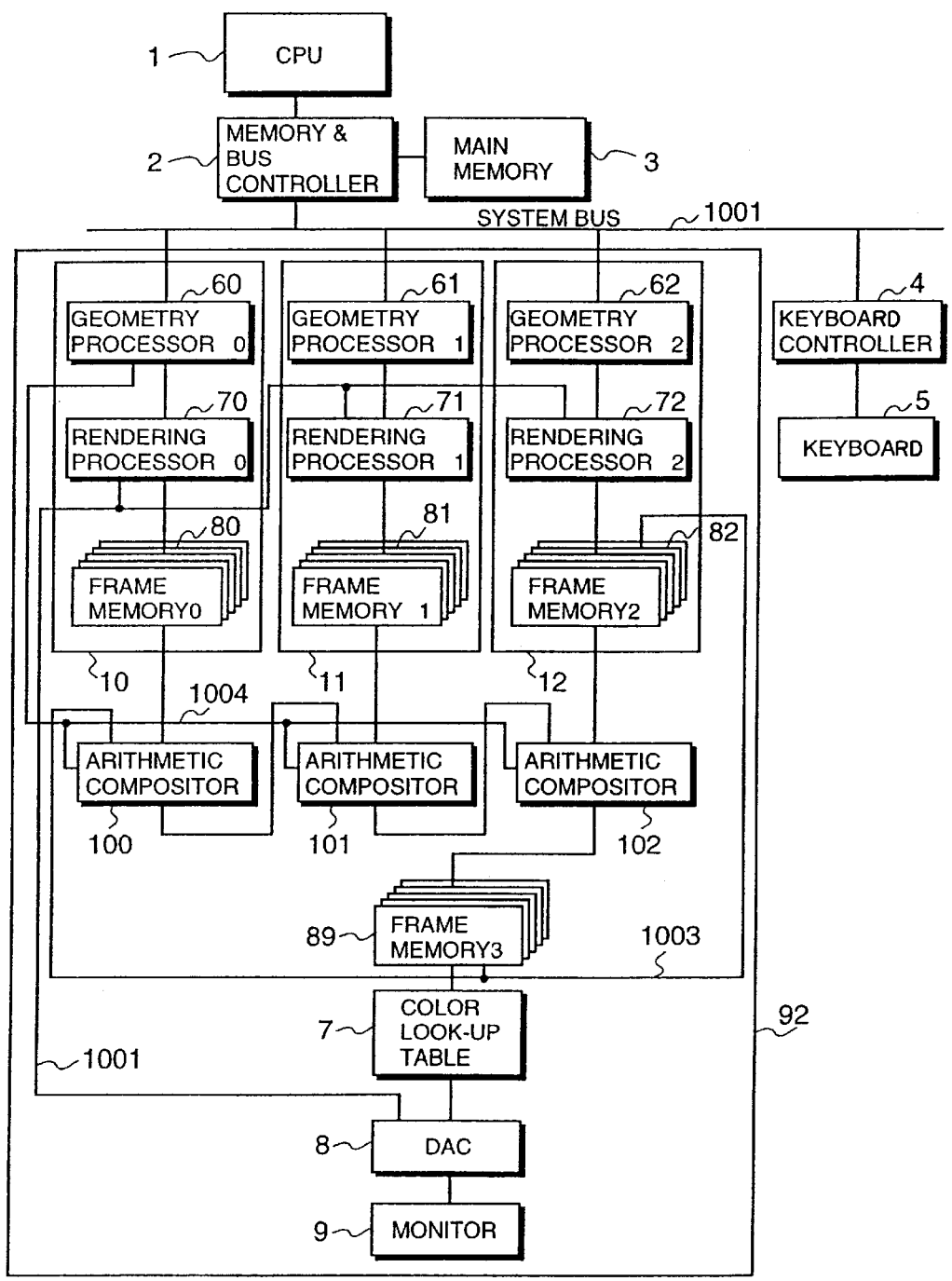
FIG. 4 is an overall block diagram of a system representing another embodiment of the invention.

FIG. 4 is an overall block diagram of a system representing another embodiment of this invention. The components of the embodiment are basically the same as those of the embodiment in FIG. 2, except that a frame memory 89 and a signal line 1003 stemming from that memory are added. There is no significant difference between the two embodiments because the number of rendering devices can be readily increased by adding more arithmetic compositors in a similar setup. The frame memory 89 holds the output of the last-stage arithmetic compositor 102. The output of the frame memory 89 is placed onto the signal line 1003 and input again to the frame memory 82 of the rendering device 12. This allows the final image to be further edited or computed by use of the function of the rendering device 12. When the output of the frame memory 89 is input via the signal line 1003 to the arithmetic compositor 100, it is possible to superimpose the final image in the frame memory 89 repeatedly onto the images rendered by the rendering devices 10 through 12. The operations involved are synchronized by the signal from the signal line 1004.

FIGS. 5A through 7D depict some high-performance rendering examples effected according to the invention.

Figure 5A:
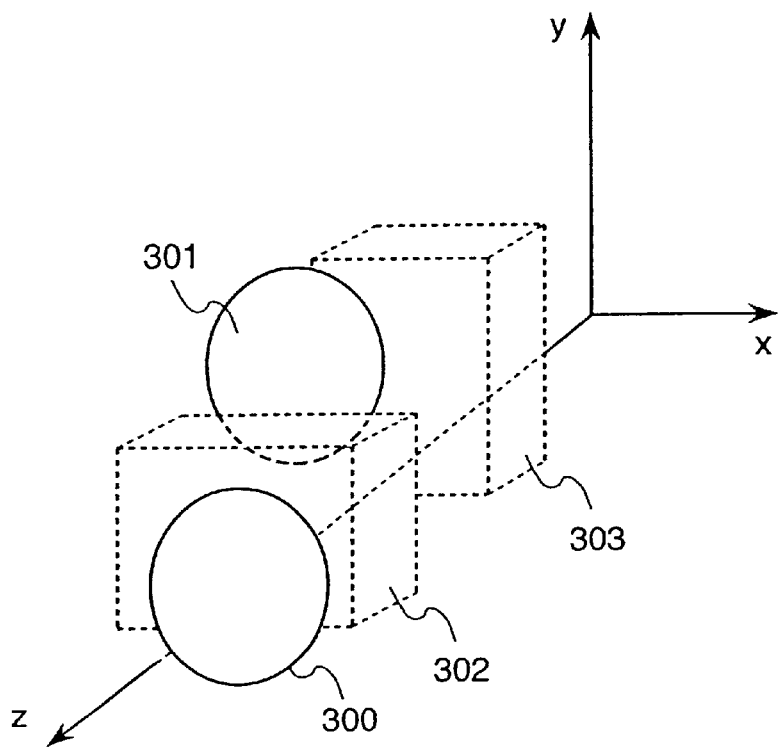
FIGS. 5A and 5B are is a schematic diagrams showing how transparent objects are rendered illustratively according to the invention.

Specifically, FIG. 5A shows an image including transparent objects, in which it is assumed that the viewpoint is on the Z axis (Z=+∞) and directed toward the point of Z=0. It is also assumed that spheres 300 and 301 with a transparency of 0 each, i.e., with a weight of 1.0 and rectangular prisms 302 and 303 with a transparency of 30% each, i.e., with a weight of 0.7, are laid out as indicated.

Below is a description of a typical rendering procedure using the system of FIG. 2. The CPU 1 generates graphics commands representing the objects shown in FIG. 5A and sends the generated commands to the graphics subsystem 91. The graphics commands representing the spheres 300 and 301 with the transparency of 0 each are transmitted to the rendering devices 10 and 11 respectively. The graphics command denoting the rectangular prism 302 with the transparency of 0.3 is sent to the rendering device 12, and the command representing the rectangular prism 303 with the transparency of 0.3 is forwarded to the rendering device 13.

In response, the rendering device 10 renders the sphere 300 and places the image data about the sphere 300 into the frame memory 80 that accumulates the image data on the sphere 300. Likewise, the rendering devices 11, 12 and 13 cause the image data on the sphere 301 and rectangular prisms 302 and 303 to be accumulated respectively. The arithmetic compositor 100 composes the image data on the spheres 300 and 301. Because the two spheres 300 and 301 have weight data of 1.0 each, only the color data about the sphere near the foreground is selected where the two spheres are overlaid.

The arithmetic compositor 101 composes, through arithmetic operations, the composed image data on the two spheres and the image data about the rectangular prism 302. Because the rectangular prism 302 is located farther than the sphere 300, the image data about the sphere 300 is selected unmodified. The selected data corresponds to an area 400 in FIG. 5B.

Outlined below with reference to FIG. 1 is typical processing regarding an area where the sphere 301 and rectangular prism 302 are overlaid (i.e., area 404 in FIG. 5B. The comparator 111 compares the depth data involved and judges that the rectangular prism 302 is closer to the foreground than the sphere 301. Given the judgment, the switcher 114 sends the color and weight data about the rectangular prism in front to the block 112 that computes the color of the near-foreground object, and transmits the data about the faraway sphere 301 to the block 113. Since the weight data on the near pixel is always zero for the current weight computing unit 122, the weight data of 0.3 about the rectangular prism 302 is output unchanged over the signal lines 1013 and 1014. The multiplier 121 multiplies the color data having the transparency of 0.3 by the color data about the rectangular prism, and sends the product to the adder 123. The adder 123 outputs its input unmodified to the adder 133. The current weight computing unit 132 receives and computes the weight data of 0.3 about the near object and the weight data of 1.0 about the faraway sphere 301. The resulting weight data of 0.7 is sent to the multiplier 131. In turn, the multiplier 131 multiplies the weight data of 0.7 by the color data of the sphere, and forwards the product to the adder 133. The adder 133 adds up the result from multiplying the prism color by 0.3 and the result from multiplying the sphere color by 0.7, and outputs the sum that is color data COLOR-OUT.

Although the example of FIG. 5A has been described using areas, the processing of the arithmetic compositors 100 through 103 actually takes place one pixel at a time.

Figure 5B:
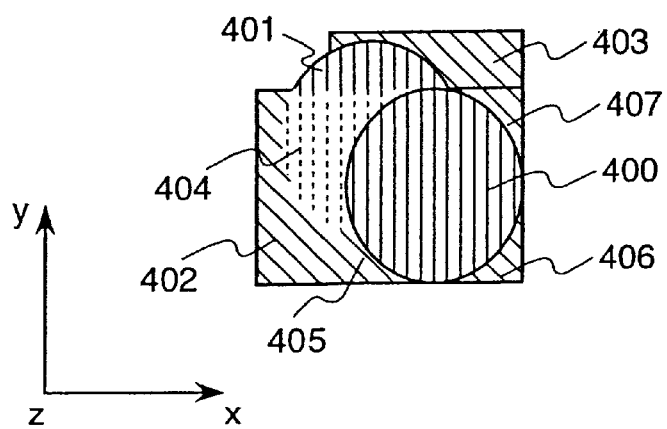

The final image, shown in FIG. 5B, reflects the depth and transparency data involved. Illustratively, the areas 400 and 401 directly reflect the spheres only, while the area 404 reflects the sphere 301 behind a transparent prism.

Figure 6A:
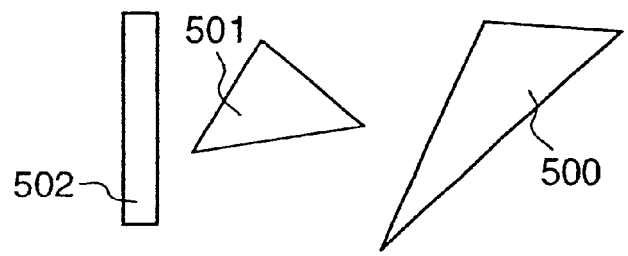
FIGS. 6A to 6C are is a schematic diagrams depicting how shaded rendering is carried out illustratively according to the invention.
Figure 6B:
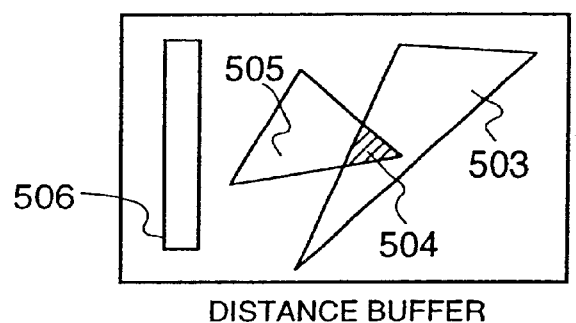
Figure 6C:
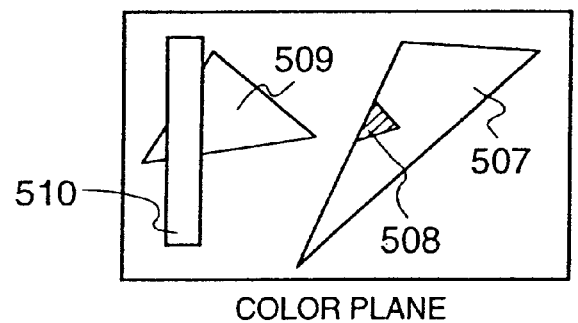

FIGS. 6A to 6C are is a schematic diagrams depicting how shaded rendering is typically carried out according to the invention. How this rendering is performed will now be described, followed by a description of how the graphics system of the invention illustratively implements the rendering. The objects to be rendered here are triangles 500 and 501 as well as a rectangle 502, shown in FIG. 6A.

Initially, how the target objects look from a light source is evaluated. The evaluation is carried out by writing, pixel by pixel, the distance between the light source and a given object to a distance buffer. At this time, as in the case of common Z buffer write control, it may happen that a distance at which a pixel is written to the distance buffer and another distance of the same pixel is again written to the buffer. In that case, the content of the distance buffer is updated if the value to be written represents a position closer to the light source than the currently retained distance; and, the Z buffer value is left unchanged if the value to be written represents a position farther than the light source. Eventually, only areas visible from the light source are written in the distance buffer. The eventual image data in the distance buffer is shown schematically in FIG. 6B. As illustrated, part of the object 500 is hidden behind the object 501. The hidden portion is an area 504.

Next, a common method of rendering relative to a viewpoint is used to perform color computations regarding a single light source while rendering the result onto a color plate. At this point, the position of the light source and the distance to the target object are calculated simultaneously per pixel. The distance computed this time is compared with the value held in the distance buffer reflecting the layout in FIG. 6B. If the compared distances are found to be different, the pixel in question is not affected by the light source. In that case, the writing of color data is masked and nothing is reflected on the color plane. If the compared distances turn out to be the same, the result of ordinary light source computations under the influence of the light source is written to the color plane.

Illustratively, while the object 501 is being rendered, the entire object 501 represents an area visible from the light source. It follows that the color data which has undergone the light source computations is written to the color plane. In this case, a common Z buffer feature of shade erasure furnishes image data in which the object 502 is superimposed on the object 501. When the object 500 is being rendered, the distance buffer accommodating the area invisible from the light source (i.e., area 504) retains the distance of the object 501 in the layout of FIG. 6B. This means that comparing the distance buffer contents leads to a difference in distance. This causes the masking function to act on the write operation to the color plane, thereby preventing color data from being written to the color plane. As a result, an area 508 is shown shaded.

The processes in FIGS. 6B and 6C are conducted relative to a single light source. These processes are repeated as many times as the number of light sources configured. Then the color results of brightness computations regarding all light sources are added up to provide final image data.

One typical shade rendering method has been described above. This shade rendering method may be implemented by the graphics system of FIG. 2 having one light source assigned to each of the rendering devices configured. For example, the rendering device 10 causes the frame memory 80 to hold image data relative to one light source. The rendering device 11 causes image data relative to another light source to be retained. In this manner, the image data acquired relative to the light sources involved are composed by the arithmetic compositors. In this case, the rendering devices share the processing of color computations relative to all light sources. That is, all rendering devices process each of the objects to be rendered. This means that the depth and weight data are the same for every rendering device. It follows that the Z_equal signal on the signal line 1011 becomes effective for all pixels. This causes the selector 204 in FIG. 3 to select the output of the selector 218. The operations involved are represented by Expressions (3), (4), (8), (9) and (10). If all weight data is 1.0, then the operations involved are simply additions.

FIGS. 7A to 7D are shematic diagrams showing how the invention is illustratively applied to a volume rendering scheme having a plurality of cross-sectional images of an object rendered as viewed from a given viewpoint. How the volume rendering scheme is generally performed will be described below, followed by a description of how this volume rendering is applied to the inventive graphics system. It is assumed that there are a plurality of cross-sectional images 601 through 604 (FIG. 7B) of an elliptic sphere 600 (FIG. 7A) and that areas 641 through 643 have a weight of 0.8 each and areas 644 through 647 have a weight of 0.1 each.

Figure 7A:
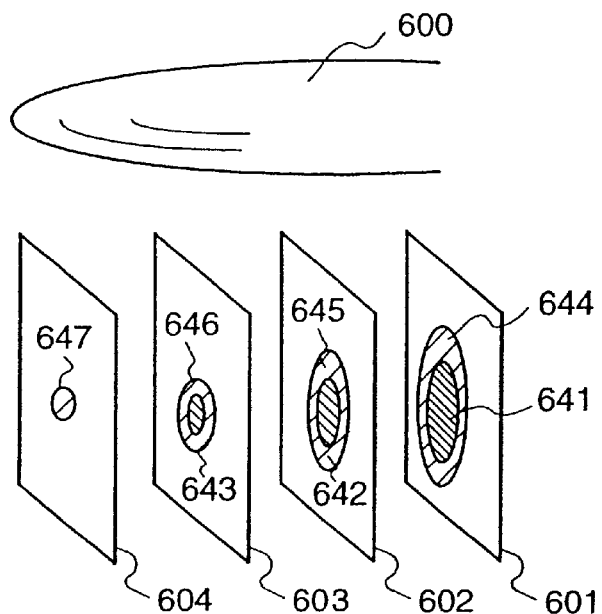
FIGS. 7A to 7D are is a schematic diagrams indicating how volume rendering is conducted illustratively according to the invention.
Figure 7B:
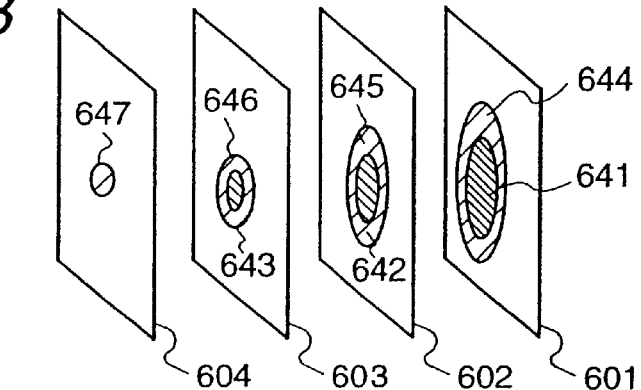
Figure 7C:
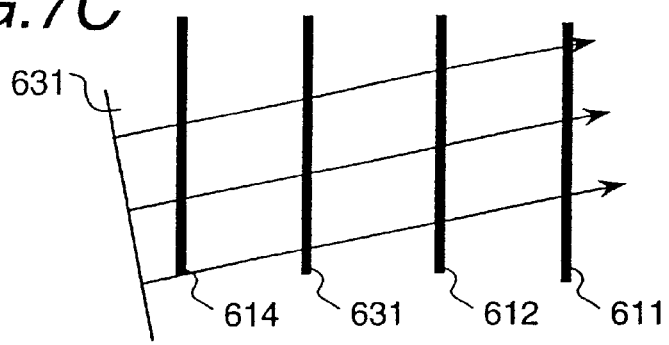
Figure 7D:
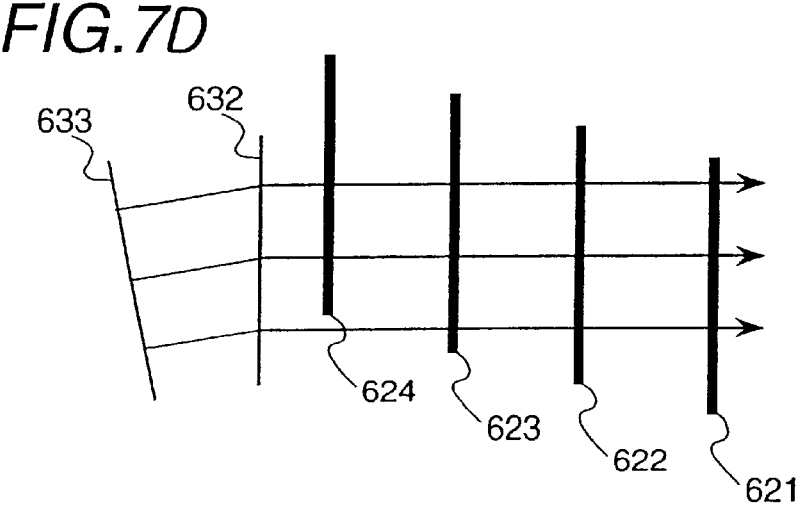

Image data 611 through 614 indicate in FIG. 7C how the cross-sectional images 601 through 604 are seen laterally. In this application, the image data 611 through 614 are projected onto a plane 631. Image data 621 through 624, as seen in FIG. 7D are identical to the image data 611 through 614.

One way of implementing this application involves setting up a projection plane 632 apart from the projection plane 631. The image data 611 through 614 are shifted in such a manner that the image data will intersect the projection plane 632 perpendicularly, whereby the image data 621 through 624 are provided. With the image data projected in this manner onto the plane 632, the projection plane 632 is converted to another projection plane 633.

To apply the above volume rendering scheme to the graphics system of FIG. 4 involves assigning one cross-sectional image to each of the rendering devices configured. For example, the cross-sectional images 601 through 604 are assigned to the rendering devices 10 through 13, respectively. The image data 621 through 624 are generated by each rendering device shifting the image data 611 through 614 in a way that the image data will intersect the projection plane 632 perpendicularly. Image data projection onto the projection plane 632 is carried out by the arithmetic compositors. The result is held temporarily in the frame memory 89. The projection plane 632 is then converted to the projection plane 633. To execute the conversion requires first transferring the output of the frame memory 89 to the frame memory 83 over the signal line 1003, and then having a rendering processor 73 perform the conversion processing involved.

It is easy to display only the areas 641 through 643 in the above application. Specifically, the weight of 0.5 for the areas 641 though 643 need only be set in the wt.min and wt.max registers by use of the signal line 1004, and the rest of the processing is the same.

The above scheme allowing the effective range of weight data to be set using the wt.min and wt.max registers is effective in extracting and rendering the interior of objects. In that case, however, the original colors are attenuated by weight data. The color attenuation is corrected by means of the color look-up table 7. Signal lines for setting the color look-up table 7 are not characteristic of this invention and are thus omitted.

Furthermore, at rate at which to monopolize one pixel for weight data may be retained. This scheme is effective in implementing antialiasing techniques.

Antialiasing of high precision may be implemented at a limited sacrifice of performance. For example, images may be created by rendering through pixel-by-pixel parallel translation performed longitudinally and crosswise by the rendering devices. One fourth of the maximum weight in effect may be set as weight data. The arithmetic compositors then multiply the image data from each rendering device by one fourth. This provides antialiasing of an enhanced precision level.

What is claimed is:

1. A graphics system comprising:
a plurality of rendering devices each including a first processor which generates rendering commands, a second processor which distributes the generated rendering commands, a frame memory which holds color, depth and weight data in increments of pixels in a screen bit map format, and a third processor which executes the distributed rendering commands to write the color, depth and weight data about each pixel to said frame memory; and
composition means for reading said color data, depth data and weight data for each pixel from each said frame memory and generating new color data and new weight data from the color data and the weight data of a same pixel position based on the depth data, said composition means reading said color data, depth data and weight data from said frame memory in synchronization with outputting generated new color data and new weight data to a display device.

2. A graphics system according to claim 1, further comprising second frame memories for accommodating said new pixel data generated by said composition means, the pixel data in said second frame memories being read for input to said composition means.

3. A graphics system according to claim 1, further comprising second frame memories for accommodating said new pixel data generated by said composition means, and transfer means for transferring the pixel data from said second frame memories to the frame memory of each of said rendering devices.

4. A graphic system comprising:
a CPU which generates a plurality of rendering commands;
a plurality of rendering devices, each rendering device including:
a rendering processor which executes rendering commands and generates color data, depth data, and weight data about each pixel, and
a frame memory, the frame memory storing said color data, said depth data and said weight data; and
composition means for reading said color data, depth data and weight data for each pixel from each frame memory and generating new color data and new weight data from the color data and the weight data of a same pixel position based on the depth data, said composition means reading said color data, depth data and weight data from said frame memory in synchronization with outputting generated new color data and new weight data to a display device.

5. A graphics system according to claim 4 or 2, wherein, given a plurality of sets of color, depth and weight data about any one pixel position from said plurality of frame memories, said composition means first compares the depth data, multiplies successively the weight and color data starting with those corresponding to the depth data closest to the foreground and accumulates products from the multiplication, thereby generating new pixel data.

6. A graphics system according to claim 4 or 2, wherein, given a plurality of sets of color, depth and weight data about any one pixel position from said plurality of frame memories, said composition means generates new pixel data using the weight data provided said weight data exists within a predetermined range.

* * * * *